US006273485B1

(12) United States Patent
Maffeis et al.

(10) Patent No.: US 6,273,485 B1
(45) Date of Patent: Aug. 14, 2001

(54) PARALLEL PNEUMATIC GRIPPER WITH BODY AND JAWS OBTAINED FROM EXTRUDED ELEMENTS

(75) Inventors: Giuseppe Maffeis; Giuseppe Bellandi, both of Roncadelle (IT)

(73) Assignee: Gimatic S.p.A. (IT)

( * ) Notice: Subject to any disclaimer, the term of this patent is extended or adjusted under 35 U.S.C. 154(b) by 0 days.

(21) Appl. No.: 09/293,740

(22) Filed: Apr. 16, 1999

(30) Foreign Application Priority Data

Apr. 20, 1998 (IT) ........................................ 98A000035

(51) Int. Cl.[7] ........................................ B25J 15/10

(52) U.S. Cl. ........................................ 294/88; 294/119.1

(58) Field of Search ........................ 294/88, 93, 119.1, 294/902; 269/25, 27, 32, 34; 414/741, 751; 901/37, 39

(56) References Cited

U.S. PATENT DOCUMENTS

| | | | | |
|---|---|---|---|---|
| 5,529,359 | * | 6/1996 | Borcea et al. | 294/119.1 X |
| 5,595,413 | * | 1/1997 | McGeachy et al. | 294/119.1 X |
| 5,620,223 | * | 4/1997 | Mills | 294/119.1 X |
| 5,839,770 | * | 11/1998 | Zajac et al. | 294/119.1 X |
| 6,092,848 | * | 7/2000 | Maffeis et al. | 294/88 |

* cited by examiner

*Primary Examiner*—Johnny D. Cherry
(74) *Attorney, Agent, or Firm*—McGlew and Tutle, P.C.

(57) ABSTRACT

A parallel pneumatic gripper is provided with body (11) and jaws (13), which are pieces of extruded elements made of aluminum or its alloys, finished by means of extrusion and designed to be joined in a complementary manner. In addition, this pneumatic gripper has a control piston (14) that accommodates and is moved in a chamber (25) defined by two heads (12) inserted and fixed to the opposite ends of the body.

7 Claims, 2 Drawing Sheets

PARALLEL PNEUMATIC GRIPPER WITH BODY AND JAWS OBTAINED FROM EXTRUDED ELEMENTS

FIELD OF THE INVENTION

The present invention pertains to automatic grippers having a body, at least two jaws, which can move linearly in opposite directions for their action of clamping and releasing a piece and at least one pneumatic piston for controlling the movements of said jaws by means of connection elements.

BACKGROUND OF THE INVENTION

In the pneumatic grippers of the type mentioned above, the body and jaws are usually made of steel and have a rather complicated and difficult design which is created by means of machining. These grippers are inverted to create in the body a chamber for each control piston and for the guides for the jaws, and to provide complementary guide jaws for joining and sliding in the body. In addition, the mutual guide means between the body and jaws thus obtained are not always reliable and precise as desired.

SUMMARY AND OBJECTS OF THE INVENTION

The primary object of the present invention is to propose a pneumatic gripper with a simple and even economical design without the need for significant machinings, in which the guide means between the body and the jaws are highly precise, reliable and adjustable, and where the chamber for at least one control piston is defined directly by two heads inserted on opposite sides of the body.

According to the invention a parallel pneumatic gripper is provided with a body and at least two jaws that can move linearly in opposite directions for their closing and opening on a piece to be gripped and to be released. A pneumatic piston is provided for controlling the movements of the jaws by means of connection elements. The body and the jaws are formed by pieces of extruded elements made of aluminum or its alloys, which are finished by extrusion and are designed to be joined in a complementary manner. The pneumatic piston accommodates and is moved in a chamber that is defined by two heads that are inserted and are fixed to the opposite ends of the body.

Correspondingly and advantageously, the body and the jaws, which can be joined in a sliding manner, are formed by extruded elements that are made of aluminum or its alloys, respectively. The extruded elements may be obtained and finished directly by extrusion with a degree of precision and surface finish at least comparable to that which can be obtained, in the known embodiments, by machining on steel. Thus, specific restarts and machinings of the pieces intended to be joined are so eliminated. Moreover, the body on the one hand, and each jaw on the other hand, consist of a single piece, complete with related guide sections, without having to insert additional parts. Moreover, the surfaces of such extruded pieces may be subjected to treatment to increase their resistance to wear due to sliding.

The sections for guiding the pieces to be joined may be configured as desired and with a precision already when extruding the starting extrusions, and the body may be provided with molded terminal heads, which are structured to complete the body and at the same time to form a chamber for the pneumatic piston for controlling the jaws, without then having to machine such a chamber directly in the body.

Greater details of the present invention shall still become more evident from the description below with reference to the attached drawings.

The various features of novelty which characterize the invention are pointed out with particularity in the claims annexed to and forming a part of this a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
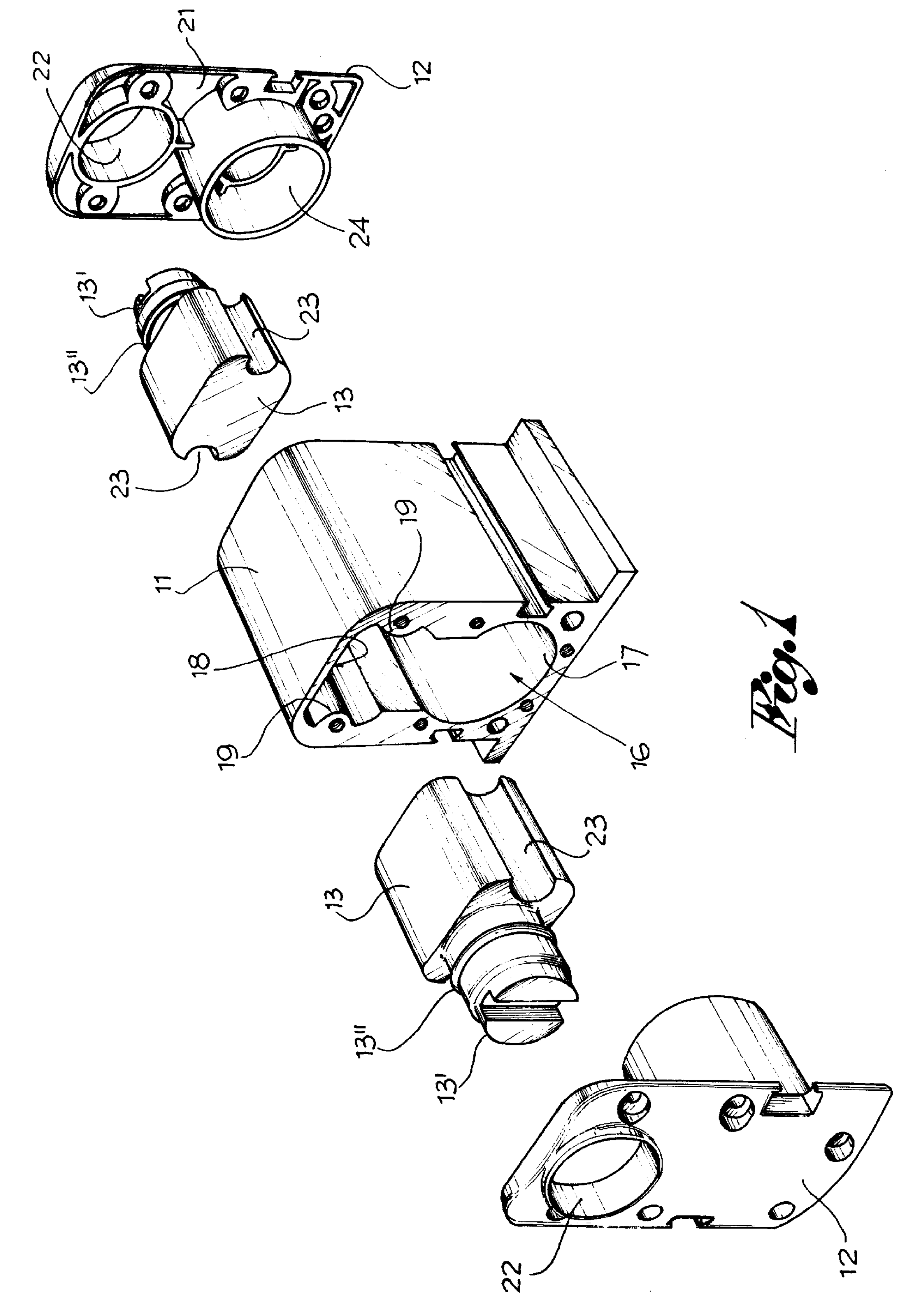
FIG. 1 is an exploded perspective view of the elements forming the body, the jaws, as well as the heads of a pneumatic gripper.

Referring to the drawings in particular, the pneumatic gripper illustrated essentially comprises a body 11, two heads 12 inserted at the ends of the body, two jaws 13, which are intended to carry the means for gripping a piece, as well as a pneumatic piston 14 for controlling the jaws 13.

The body 11 is obtained from an extruded profiled section, utilizing a piece of same. It has a basic, support surface 15 and a longitudinal cavity 16 which defines two parallel seats 17, 18, which communicate with one another. A first seat 17 is basically cylindrical, the other seat 18 is basically prism-shaped and has two guide faces 19 on opposite sides.

The two heads 12 are obtained from molding preferably made of a plastic material and they are fixed to the ends of the body 11 by means of screws 20. The heads 12 have a solid part 21 for closing the respective end of the first seat 17 of the body 11 and a hole 22 level with and on the axis of the second seat 18 of the body proper.

Each jaw 13 is obtained from a continuous extruded element as well. It has a section, which corresponds to that of the second prism-shaped seat 18 of the body, and in particular, has two lateral notches 23 which are intended to be joined in a sliding manner with the guide faces 19 on opposite sides of the said seat 18.

On each jaw 13 may be provided a cylindrical zone 13', which passes through and is guided, with the insertion of a seal 13" in the hole 22 of the respective head 12.

On their solid part 21 for closing the first seat 17 of the body 11, each of the heads 12 has a cylindrical portion 24 which is turned towards the interior in the manner of covering the seat proper. Therefore, the cylindrical portions 24 of the heads 12 are turned towards one another, are coaxial and together form a chamber 25 for accommodating and guiding the control piston. In fact, this piston 14 (FIG. 2) is guided in the cylindrical portions 24 with the insertion of seals 26 and is alternatively moved by a pressurized fluid sent/discharged in the chamber 25 at the opposite ends piston through inlet/outlet holes 25' which are connected to the distribution pipes of such a fluid.

Figure 2:
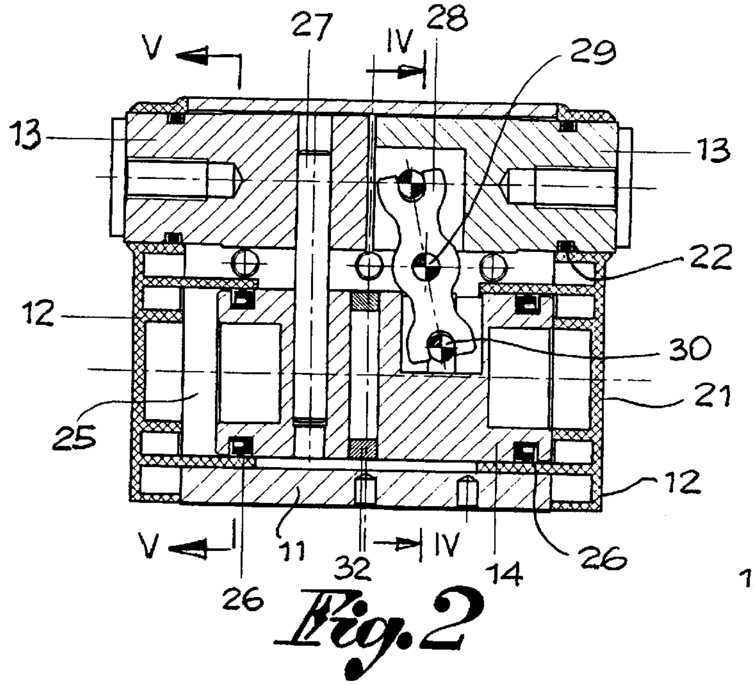
FIG. 2 is a longitudinal sectional view of the assembled pneumatic gripper.
Figure 3:
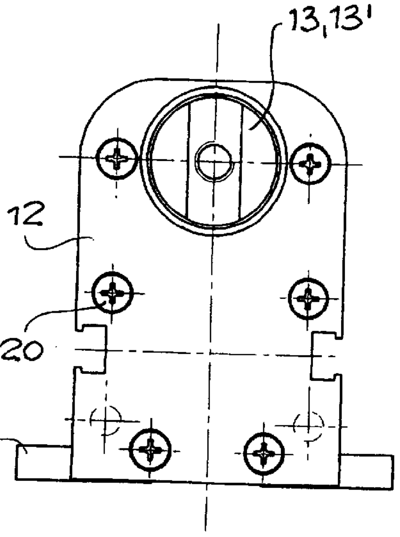
FIG. 3 is an end view of the gripper of FIG. 2.
Figure 4:
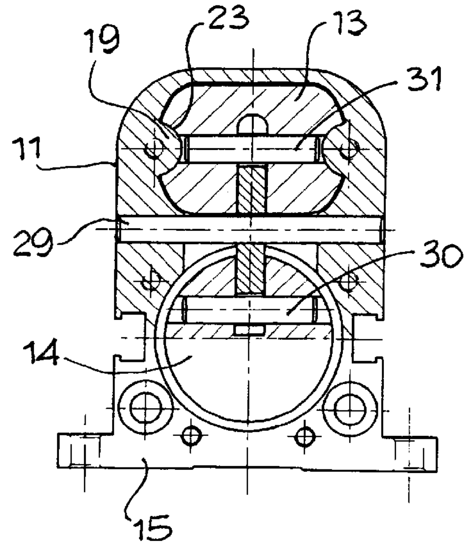
FIG. 4 is a cross sectional view according to the arrows IV—IV of FIG. 2.

The jaws 13 are moved in directions opposite one another by the piston 14. For this purpose one of the jaws is rigidly fixed to the piston by means of a pin 27, while the other jaw is connected to the piston by means of a lever 28, which oscillates on a central pivot 29 and is joined, at its ends, with pins 30 and 31 fixed to the piston and to the jaw, respectively (FIGS. 2 and 4).

The piston 14 may be provided with a magnetic element 32 that is intended to interact with sensors indicating the status of the closed and open gripper.

Figure 5:
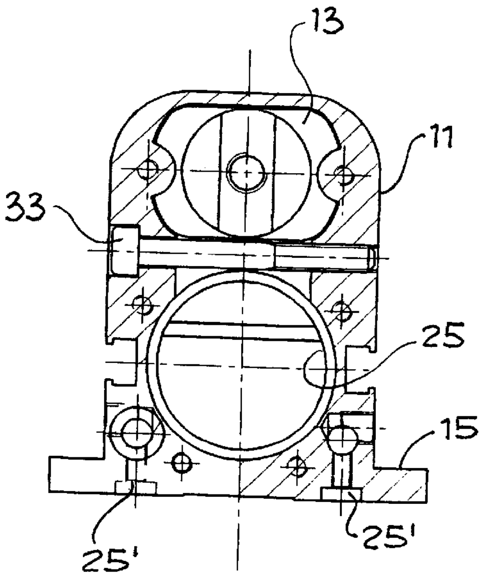
FIG. 5 is a cross sectional view according to the arrows V—V of FIG. 2.

Finally, it should be noted that the clearances between the body and the jaws may be varied and adjusted at any time, even as a result of wear due to use, by means of adjusting screws 33 which transversely connect the lateral walls of the body (FIG. 5) in order to close them in different ways by utilizing their relative elasticity.

While a specific embodiment of the invention has been shown and described in detail to illustrate the application of the principles of the invention, it will be understood that the invention may be embodied otherwise without departing from such principles.

What is claimed is:

1. A parallel pneumatic gripper comprising:

a body formed by an extruded element made of one of aluminum and aluminum alloys, which are finished by extrusion;

two jaws that can move linearly in opposite directions for closing and opening on a piece to be gripped and to be released formed by pieces of extruded elements made of one of aluminum and aluminum alloys, which are finished by extrusion and are shaped with said body in a complementary manner;

a pneumatic piston for controlling the movement of said jaws;

a connecting means for transmitting movement from said piston to said jaws;

two heads inserted in and fixed to the opposite ends of said body, said pneumatic piston being accommodated in and being moved in a chamber defined by said two heads, said body has a basic, support surface and a longitudinal cavity which delimits a first cylindrical seat and a second prism-shaped seat, which are parallel and open towards one another, in which said second seat has longitudinal guide faces on at least two opposite sides for said jaws, and in which said first seat is closed at its ends by said inserted two heads, each of said two heads defining a hole on an axis of said second seat.

2. The pneumatic gripper in accordance with claim 1, wherein each of said jaws has a section, which corresponds to that of said second seat of said body and has at least two lateral notches for joining with said guide faces in said second seat, and one of said jaws has a section that passes through and is guided in one of said holes of said head.

3. The pneumatic gripper in accordance with claim 1, wherein said heads have a cylindrical portion, which extends like a cover in a first cylindrical seat of said body, and in which the cylindrical portions of the two heads together delimit said chamber for accommodating and guiding said piston for controlling said jaws.

4. The pneumatic gripper in accordance with claim 1, wherein said body has two lateral walls, which are connected by one or more adjusting screws in order to close them in different ways and to adjust a joining clearance between sliding elements.

5. A pneumatic gripper comprising:

a body formed by an extruded element and finished by extrusion, said body defining a longitudinal cavity delimiting a first cylindrical seat and a second prism-shaped seat, which are substantially parallel and open towards one another; said second seat having longitudinal guide faces on at least two opposite sides;

two jaws linearly movable in opposite directions in said body for closing and opening on a piece to be gripped and to be released, said jaws being formed by pieces of extruded elements which are finished by extrusion and are shaped substantially complementary to said second seat;

a pneumatic piston in said first seat;

connecting means for transmitting movement from said piston to said jaws;

two heads inserted in and fixed to opposite ends of said body, said pneumatic piston being accommodated in and being moved in a chamber defined by said two heads, said first seat being closed at its ends by said inserted two heads, each of said two heads defining a hole on an axis of said second seat.

6. A pneumatic gripper comprising:

a body formed by an extruded element and finished by extrusion, said body defining a longitudinal cavity delimiting a first seat and a second seat;

two jaws linearly movable in opposite directions in said body for closing and opening on a piece to be gripped and to be released, said jaws being formed by pieces of extruded elements which are finished by extrusion and are shaped substantially complementary to said second seat;

a pneumatic piston in said first seat;

connecting means for transmitting movement from said piston to said jaws;

two heads inserted in and fixed to opposite ends of said body, said pneumatic piston being accommodated in and being moved in a chamber defined by said two heads, said heads having a cylindrical portion, which extends like a cover in said first cylindrical seat of said body, and in which said cylindrical portions of said two heads together delimit said chamber for accommodating and guiding said piston for controlling said jaws.

7. A pneumatic gripper comprising:

a body formed by an extruded element and finished by extrusion, said body including two lateral walls;

two jaws linearly movable in opposite directions in said body for closing and opening on a piece to be gripped and to be released, said jaws being formed by pieces of extruded elements which are finished by extrusion and are shaped with said body in a complementary manner;

a pneumatic piston for controlling the movement of said jaws;

connecting means for transmitting movement from said piston to said jaws;

two heads inserted in and fixed to opposite ends of said body, said pneumatic piston being accommodated in and being moved in a chamber defined by said two heads;

an adjusting screw arranged in said lateral walls in order to adjust a joining clearance between said body and one of said jaws and said piston.

* * * * *